United States Patent Office

2,844,490
Patented July 22, 1958

---

2,844,490

TEXTILE DECORATING AND TEXTILE PRINTING PASTE

Wolfgang Lehmann, Leverkusen-Bayerwerk, Ferdinand Münz, Koln-Stammheim, Otto Bayer, Leverkusen-Bayerwerk, and Helmut Kleiner, Opladen, Germany, assignors to Farbenfabriken Bayer Aktiengesellschaft, Leverkusen, Germany, a corporation of Germany No Drawing. Application October 6, 1953
Serial No. 384,514

Claims priority, application Germany October 20, 1952

10 Claims. (Cl. 117—38)

This invention relates to a new process of decorating substrata, especially textile fabrics.

In our copending applications Ser. No. 300,339, Patented January 29, 1957, No. 2,779,686, and Ser. No. 300,340, patented July 23, 1957, No. 2,800,417, there is described a process of decorating substrata, especially textile fabrics by heating nitrogen-containing basic polymers, which contain in the same molecule apart from basic amino groups, groups which are capable of reacting with basic amino groups with cross-linking at temperatures of about 80–200° C.

In the further investigation of this field we have found that products containing in their molecule, apart from basic groups, free epoxy groups are obtained by reacting epichlorohydrin upon ammonia, substances yielding ammonia, for instance hexamethylenetetramine, or upon amines or polyamines. By heating to temperatures of about 80–200° C. these compounds self-link by reaction of the epoxy groups with the basic amino groups whereupon water-insoluble products are obtained. As the products obtained according to our copending Patents 2,779,-686 and 2,800,417, the reaction products of epichlorohydrin and ammonia or amines are excellently suitable for producing insoluble films or coatings, for fixing pigments in textile printing or in slop-padding, for impregnating, sizing, etc. The term "pigment" as used herein is meant to define this material in its normal fashion to cover insoluble pigments only.

In the reaction of epichlorohydrin upon ammonia according to the invention probably mixtures of diaminohydroxy propane, dihydroxydipropylene triamine and polyamines of higher molecular weight are formed in the first reaction step, probably according to the formula:

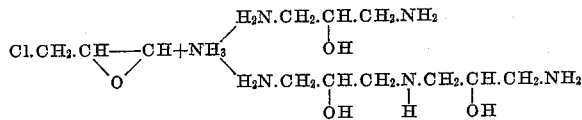

These mixtures of amines yield with epichlorohydrin higher molecular weight basic products containing epoxy groups apart from basic amino or imino groups.

When polyamines, such as dipropylenetriamine, are employed instead of ammonia, higher molecular weight basic compounds containing free epoxy groups are obtained directly.

In the above reaction epichlorohydrin may also be replaced by dichlorohydrin and alkali.

Suitable amines are: Methylamine, ethylamine, butylamine, hexylamine, 1.3-diamino-propanol; furthermore ethylenediamine, propylenediamine, hexamethylenediamine, γ,γ′-diaminopropylether, diethylenetriamine, dipropylenetriamine, γ,γ′-diaminodiaminopropyl methylamine, triethylenetetramine, tripropylenetetramine, tetraethylenepentamine, diaminopropyltetramethylenediamine.

Additives such as lactices, emulsions or dispersions of insoluble substances and plasticizers etc., which are customarily employed in printing and decorating textiles, may be incorporated with the products produced according to the invention.

The present invention allows of producing products which are capable of reacting at raised temperatures with self-linking.

The invention is further illustrated by the following examples without being restricted thereto, the parts being by weight.

*Example 1*

92 parts (1 mol) of epichlorohydrin are added during half an hour to a solution of 48.3 parts (⅓ mol) of γ,γ′-diaminopropyl-methylamine of the formula

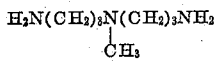

in 500 parts of water heated to 55° C. The solution is stirred at this temperature until the viscosity has risen to about 200 centipoise which lasts approximately 4 hours. Then the solution is stabilized by addition of 25 parts of concentrated hydrochloric acid.

The viscous solution thus obtained is highly suitable as fixing agent in slop-padding, for instance according to the following recipe:

70 parts of the above solution,
6 parts of a 15 percent paste of copper phthalocyanine, and
924 parts of water.

After slop-padding the fabric is dried and subsequently heated to 120° C. for 5 minutes. The colorings thus obtained are distinguished by excellent fastness to rubbing in the dry and wet state and excellent fastness to washing and to light.

Products which are also suitable for decorating textiles are obtained if dipropylenetriamine is used in the above reaction instead of γ,γ′-diaminopropyl-methylamine.

*Example 2*

460 parts of epichlorohydrin are added to 6000 parts of 25 percent ammonia. Dissolution takes place rapidly. After the evolution of heat has ceased, the reaction mixture is heated to 90° C. and 200 parts of sodium hydroxide are added. The solution is evaporated until the equivalent weight amounts to 400, which corresponds to a 12 to 13 percent solution of the reaction product. The latter consists of a mixture of diaminopropane and various polyamines.

782 parts (8.5 mols) of epichlorohydrin are added to 3400 parts of the above solution after cooling. The temperature rises to 80 to 85° C. within a short time and the solution is stirred until the viscosity amounts to 130 centipoise, while the temperature drops to 60° C. Then 50 parts of concentrated hydrochloric acid are added in order to interrupt the condensation and the mixture is evaporated in vacuo to a residue of 3000 parts. The viscous solution contains about 30 percent of a base of high molecular weight in the form of its hydrochloride. On addition of acid binding substances and evaporation the base condenses to an insoluble mass.

60 parts of a 15 percent paste of copper phthalocyanine are stirred together with 60 parts of water. The mixture is passed through a sieve and 60 parts of the above condensation product and 20 parts of sodium acetate are added. Then the mixture is brought to a volume of 1000 parts by addition of water.

Cotton nettle cloth is slop-padded with the above solution on a padding machine, subsequently dried and heated to 120° C. for 5 minutes.

A brilliant blue, uniform coloring of very good fastness properties is thus obtained.

We claim:

1. A printing paste consisting essentially of an aqueous solution of a salt of a high molecular weight compound containing epoxy groups and, in addition, groups selected from the group consisting of primary and secondary amine groups, said compound being obtained by reaction of a compound selected from the group consisting of epichlorohydrin and dichlorohydrin with a compound selected from the group consisting of ammonia, an alkylamine and aliphatic polyamines at temperatures up to about 100° C., a thickening agent and a pigment.

2. A printing paste as claimed in claim 1 wherein the high molecular weight compound is obtained by reaction of epichlorohydrin with γ,γ'-diaminopropyl-methyl-amine.

3. A printing paste as claimed in claim 1 wherein the high molecular weight compound is obtained by reaction of epichlorohydrin with ammonia.

4. A printing paste as claimed in claim 1 wherein the high molecular weight compound is obtained by reaction of epichlorohydrin with hexamethylenetetramine.

5. A printing paste as claimed in claim 1 wherein the high molecular weight compound is obtained by reaction of epichlorohydrin with dipropylenetriamine.

6. The process for decorating textiles which comprises applying to said textiles a printing paste as claimed in claim 1 and developing at temperatures from 80 to about 200° C.

7. The process for decorating textiles which comprises applying to said textiles a printing paste as claimed in claim 2 and developing at temperatures from 80 to about 200° C.

8. The process for decorating textiles which comprises applying to said textiles a printing paste as claimed in claim 3 and developing at temperatures from 80 to about 200° C.

9. The process for decorating textiles which comprises applying to said textiles a printing paste as claimed in claim 4 and developing at temperatures from 80 to about 200° C.

10. The process for decorating textiles which comprises applying to said textiles a printing paste as claimed in claim 5 and developing at temperatures from 80 to about 200° C.

References Cited in the file of this patent

UNITED STATES PATENTS

| | | |
|---|---|---|
| 1,977,251 | Stallman | Oct. 16, 1934 |
| 1,977,252 | Stallman | Oct. 16, 1934 |
| 1,977,253 | Stallman | Oct. 16, 1934 |
| 2,296,225 | Ulrich | Sept. 15, 1942 |
| 2,494,810 | Otley et al. | Jan. 17, 1950 |
| 2,510,885 | Greenlee | June 6, 1950 |
| 2,585,115 | Greenlee | Feb. 12, 1952 |
| 2,601,661 | Kienle et al. | June 24, 1952 |
| 2,641,554 | Meunier | June 9, 1953 |
| 2,643,958 | Kleiner et al. | June 30, 1953 |